United States Patent
Rasmussen

[15] 3,673,291
[45] June 27, 1972

[54] METHOD FOR THE PRODUCTION OF SYNTHETIC SHEET MATERIALS

[72] Inventor: Ole-Bendt Rasmussen, Topstykket 7, Birkerod, Denmark

[22] Filed: Dec. 27, 1968

[21] Appl. No.: 787,388

[30] Foreign Application Priority Data

Dec. 28, 1967 Republic of South Africa.....67/7792
Dec. 29, 1967 Great Britain..................59,204/67
Feb. 27, 1968 Denmark..........................766/68
June 25, 1968 Denmark.........................3028/68
Sept. 11, 1968 Denmark.........................4357/68

[52] U.S. Cl..................................264/46, 18/13 P, 264/47, 264/49, 264/147, 264/173, 264/312, 264/DIG. 47
[51] Int. Cl.....................B29d 7/16, B29d 27/00, B29f 3/10
[58] Field of Search.................264/171, 173, DIG. 8, 46, 47; 18/13 P

[56] References Cited

UNITED STATES PATENTS 3,323,978  6/1967  Rasmussen............................264/171
3,349,437  10/1967 Quakenbush..........................264/171
3,416,986  12/1968 Carley..................................264/146
3,485,912  12/1969 Shrenk et al..........................264/171
3,494,993  2/1970  Breidt, Jr. et al.....................264/171

Primary Examiner—Robert F. White
Assistant Examiner—Jeffery R. Thurlow
Attorney—William J. Daniel

[57] ABSTRACT

Method for the production of sheet materials comprising the steps of preparing a fluid lamellar sheet product in which the lamellae are laying in flat sandwich-like arrangement at the surfaces and are perpendicular to the sheet plane in the core zone, setting said sheet product, disrupting the connections between the lamellae in the core zone and separating the sheet product thus formed into two parts in a plane substantially parallel to the sheet plane. In a specific embodiment the fluid sheet product comprises two sets of lamellae, each set forming one surface layer, the lamellae of said two sets being in intermeshing arrangement within the core zone.

16 Claims, 12 Drawing Figures

METHOD FOR THE PRODUCTION OF SYNTHETIC SHEET MATERIALS

BACKGROUND OF THE INVENTION

The present invention relates to the production of synthetic sheet materials suitable for textile purposes.

A prior art method for the production of synthetic sheet materials comprises the steps of extruding lamellae of a polymeric material in interspersed relationship with lamellae of an extrudable material to form a fluid sheet structure and combing threads out from the lamellae of said polymeric material to form bundles of threads which bond said lamellae together and impart to said sheet material a soft handle.

However, when using said prior art method it is difficult to obtain sheet materials in which the lamellae are bonded strongly together and which also have a soft handle. Furthermore, the prior art method requires the use of relatively great amounts of extrudable substance to make the sheet materials produced sufficiently open to be used for textile purposes and this extrudable material is normally of little use in the final product and is generally wholly or partially removed.

The object of the invention is to provide a sheet material having a soft handle on at least one surface and comprising lamellae which are firmly bonded together, by using relatively small amounts of said extrudable material.

SUMMARY OF THE INVENTION

According to the invention there is provided a method comprising the steps of extruding separate streams of a first extrudable polymeric material and a second extrudable material, joining said streams to form a fluid sheet structure comprising lamellae of said first extrudable polymeric material in interspersed relationship with lamellae of said second extrudable material, smearing out the surfaces of said fluid structure to form a sheet structure in which said lamellae are laying in flat sandwich-like arrangement and in which the lamellae of the first extrudable polymeric material are bonded together at the surfaces of said sheet structure and are substantially perpendicular to the sheet plane in the core zone, setting said sheet structure and disrupting the connections between the lamellae of the first polymeric material in said core zone and separating the sheet into two parts in a plane substantially parallel to the sheet plane either before, during or after said disruption.

By separating the sheet material in which the lamellae are bonded together at the surfaces and are perpendicular to the sheet plane in the core zone, sheet materials are obtained which have an open structure at one surface and in which the lamellae are bonded strongly together at the other surface.

The term "lamellae" defines structures in which one dimension is much less than the two other dimensions.

The separation of the sheet material can be effected by cutting action, e.g., by means of a knife or a saw, which is adjusted so as to cut through the lamellae in the core zone in a sheet material which is moved towards said knife or saw.

It is also to be understood that the terms "first extrudable polymeric material" and "second extrudable material" each can comprise several different materials which are extruded in the form of different streams. Normally, the second extrudable material is also polymeric. However, this is not required and it may for example be a paste. The second extrudable material may be selected so as to be disruptable or in other words so that it can be removed or subdivided or be brought to crack apart from the lamellae of the first extrudable polymeric material. The disruption may often be initiated with one or more preliminary treatments. Such treatments may involve expansion by means of an expansion agent which may be introduced into the second extrudable material before, during or after extrusion. The expansion may even take place simultaneously with the formation of the sheet structure during extrusion. Alternatively, there may be incorporated in the second extrudable material an oil which is soluble in the fluid material but bleeds out on solidification of the latter. The cracking of the lamella structure to initiate the disruption can be carried out mechanically by rolling, impacting, bending or by use of an accoustic field, and the final disruption is preferably carried out by drawing. The disruption may also be facilitated or carried out by swelling or wholly or partially removing the second extrudable material.

It is not required that the disruption be confined to the core zone. Thus, it may be advantageous also to disrupt the surface layers provided the coherence is maintained. This coherence may be increased by means of an adhesive.

In a preferred embodiment of the invention the fluid sheet structure is preferably combed during said smearing action so as to draw threads from the lamellae of the first extrudable polymeric material and to form bundles of threads bonding said lamellae together. Within each bundle the thread formed lamellae portions form the flat sandwich-like arrangement.

Instead of cleaving the sheet material the two parts may also be torn or peeled apart and this step may be facilitated by extruding one or more extrudable first polymeric materials so as to form separate lamellae located on opposite sides of the plane of separation of said sheet structure. Thus, the first extrudable polymeric material is not present in the zone of separation which essentially consists of said second extrudable substance. However, other materials forming part of the sheet material may also be present in this zone. Lamellae of the first polymeric material located on opposite sides of the plane of separation are preferably formed by using an extrusion device in which the orifices for extruding lamellae of said first extrudable polymeric material comprises a separating wall located at the core zone of the extruded sheet structure. Another way of preparing a fluid sheet structure in which the lamellae of the first polymeric material are located on opposite sides of the zone of separation consists in using an extrusion device in which the extrusion orifices for the first extrudable polymeric material and located on opposite sides of the zone of separation are offset relative to one another and are located so as to extrude streams of said first polymeric material between the streams of said second extrudable material. In this manner there is also established a zone in the core wherein the first polymeric material is absent. The separation may for example be carried out by a peeling action at a temperature at which the first polymeric material is in solid state while the second extrudable material is fluid or semi-fluid.

If the second extrudable material is a suitably selected polymeric material and is retained in the final product, at least in a substantial amount, this material may impart to the product desirable properties for instance the well known bicomponent effects. In order to facilitate the separation of the sheet material under these conditions a third extrudable material is extruded in streams so as to form lamellae of said third extrudable material in the plane of separation and wholly or partially removing said third extrudable material either during or after the separation of the sheet while leaving a substantial part of said second extrudable material in the sheet. Said total or partial removal of the third extrudable material may be carried out by leaching either before or after the separation process. Alternatively, the separation of the sheet and the removal of said third extrudable material may be fully mechanical. The removal can for example be carried out by brushing or scraping.

In a preferred embodiment of this method the third extrudable material is incompatible with both the first polymeric material and the second extrudable material. In this manner the adhesion between the third extrudable material and each of said other two materials will be very weak and thus a mechanical removal of the third extrudable material is facilitated.

In another embodiment of the invention the streams of the third extrudable material are joined with the streams of the first extrudable polymeric material and of the second extrudable material so as to form a continuous layer of said third extrudable material within the zone of separation of the sheet. In this manner the tearing or peeling as well as the removal of the third extrudable material is particularly easy.

In an alternative embodiment of the invention the streams of the second and the third extrudable material are joined so as to form alternating lamellae within the zone of separation. The material thus produced may be more difficult to separate but portions of the second extrudable material may be drawn out from the surface of the sheet material as a nap. In order to facilitate the formation of such a nap the separation may be carried out at a temperature at which the first polymeric material has been solidified while the second extrudable material is still fluid or semi-fluid.

In a further embodiment of said method the second extrudable material is a finely dispersed mixture of two or more polymers whereas the third extrudable material is a substantial homogeneous material. When separating such a sheet material the second extrudable material forms fine split-fibers which are important as far as the handle of the sheet material is concerned, particularly when said split-fibers are drawn out as a nap as mentioned above.

In a further preferred embodiment of the method of the invention the second extrudable material is a further extrudable polymeric material and streams of the first polymeric material and said further polymeric material are joined so as to form a fluid sheet structure in which the lamellae of the first and the further polymeric materials are located in interspersed relationship only in the core zone of the sheet. Thus, before the separation the extruded sheet material consists of lamellae of the first polymeric material traversing part of the sheet and being bonded strongly together in a surface layer, hereinafter called the first layer, and lamellae of said further polymeric material traversing part of the sheet and being bonded together in a layer at the other surface of the sheet, hereinafter called the second layer. As mentioned above the first layer is practically devoid of portions of the lamellae of said further polymeric material and the second layer is practically devoid of portions of the lamellae of the first polymeric material. The core layer of said sheet material contains portions of the lamellae of the first polymeric material and portions of the lamellae of the further polymeric material in intermeshing relationship and are cleavably bonded to one another. The term "cleavably bonded" is used to indicate that the bonding is of such nature that it is possible to eliminate said bonding without causing substantial damage to the lamellae of the first and the further polymeric materials and without eliminating the bonds within the first and the second layers. When separating such a sheet material two halves are formed having protruding lamellae of the first polymeric material and the further polymeric material, respectively.

A cleavable bonding is preferably provided by using polymeric materials which are incompatible, i.e., insoluble in one another in fluid or semi-fluid state. As an example sheet materials in which the first polymeric material is a polyamide and the further polymeric material is high density polyethylene or polyester can easily be peeled into two halves by mechanical action alone and both halves will be suitable for textile or textile-like purposes.

In case the first and the further polymeric materials are compatible with each other or are identical materials which is normally advantageous it is necessary to interpose lamellae of a suitable fourth extrudable material in the core zone between the lamellae of the first polymeric material and the lamellae of the further polymeric material so as to form zones of cleavage between said lamellae.

Thus, a preferred embodiment of the invention comprises the extrusion of streams of a fourth extrudable material and joining said streams with streams of the first and the further polymeric materials so as to form a sheet structure in which the intermeshing lamellae of the first and the further polymeric materials in the core zone are separated by lamellae of said fourth extrudable material.

The effect of the intermeshing arrangement of the lamellae of the first and the lamellae of the further polymeric materials is that the surface structure produced during the separation becomes open even if no or only small amounts of the second extrudable material are used. In order to facilitate the separation of the extruded sheet materials into two parts the lamellae having edges located within the core zone are preferably tapered.

In order to further improve the handle of the sheet material of the invention the fourth extrudable material may be a polymer-in-polymer emulsion in which one of the constituents is capable of forming strong adhesive bonds with the first and/or the further polymeric materials and the other serve to impart splittability to said fourth extrudable material. During the cracking and/or peeling actions the sheets prepared will obtain a nap of split-fibers. A particularly suitable nap is formed when the two halves are peeled apart at a temperature at which the fourth extrudable material is in semi-fluid or fluid state while the lamellae of the first and the further polymeric material are solid. If it is desired to obtain a nap of split-fibers it is preferred to remove the constituents admixed to make the remaining portion of the fourth extrudable material splittable or to strongly swell and subsequently reciprocate said constituents. Such treatment can be carried out either before or after the separation of the sheet into two halves.

To produce a sheet material to be separated into two halves it is preferred to use an extrusion device comprising a circular row of spaced orifices preferably slots forming an angle to the direction of said row. This circular row of spaced orifices comprises a set of orifices for extruding the first polymeric material and a second set of orifices for extruding the second extrudable material. The two sets of orifices are arranged to extrude the components in interspersed relationship into a collecting chamber which has an outlet slot extending along the length of said row. The collecting chamber should preferably narrow down after the extrusion orifices preferably into a neck, i.e., very rapidly, in order to enable a high shear to be produced between the orifices in said row of orifices and the walls of the collecting chamber. The circular row of orifices and the collecting chamber rotate relative to each other and thus the extruded streams are drawn to form lamellae and are deflected from the forward direction to a helical arrangement when passing through the collecting chamber in which they continue the flow in a "broadside" manner. The "broadside" manner flow through the collecting chamber and the slot at its end will cause the lamellae to be smeared out to form a flat sandwich-like arrangement in the surface layers by dragging.

Each of the small channels feeding the extrusion orifices should preferably be restricted at the extrusion orifices in order to produce a relatively high pressure drop in said orifices thus increasing the possibility for using different viscosities of the components.

When extruding a sheet material in which lamellae of the first polymeric material and a further polymeric material are in intermeshing arrangement in the core zone and are separated by lamellae of a fourth extrudable material, the slots used for the extrusion of the first polymeric material are offset from the slots used for extruding the further polymeric material, whereas the ends of the slots used for extruding the fourth extrudable material extend so far from the center as to secure the separation of the lamellae of the first polymeric material from the lamellae of the further polymeric material. The bonds between the lamellae in the surface layers are normally created by using slots for extruding the fourth extrudable material which are sufficiently short to allow the lamellae in the surface layer to fuse together. Alternatively, the bonds are created by using a comb-like device at one or both surfaces of the fluid sheet structure in the collecting chamber. It is also possible to form each tooth of said comb-like device as an extrusion nozzle capable of injecting further lamellae into the surface of the sheet structure.

In order to obtain an improved textile feel it is desirable to subject the lamellae to a strong drawing action. In order to avoid high rotational speeds and to obtain high production rates it is normally desirable to draw the lamellae in two steps while they are fluid. This may be achieved by supplying the collecting chamber with a large number of dividing walls so as to form in the collecting chamber a row of channels parallel to the row of extrusion orifices and feeding the fluid lamella material emerging from the channels into a second collecting chamber that also extends along the row. This second chamber preferably includes a neck leading to its slot. This chamber as well as the row of extrusion orifices in which the lamellae are originally formed are preferably stationary with respect to the row of slots whereas the first collecting chamber is rotated.

The textile or textile-like product obtained by separating the sheet materials produced have a surface bonding layer at one surface and a pile consisting of upstanding lamellae at the other surface. In case the bonding layer is continuous the products are particularly suitable as carpeting or for upholstery. In case the bonding layer is of disrupted structure and the bonding is established through bundles of threads the products are suitable for instance for apparel or window curtains.

The first polymeric material used in the method according to the invention may be any extrudable polymeric material suitable for preparing textile-like products and can be either crystalline or amorphous in solid state.

Both fully synthetic and semi-synthetic polymeric substances may be used. In some cases it is advantageous to use a pre-polymer material which is cured after extrusion.

As mentioned above the first extrudable polymeric material and the second extrudable material may consist of several different materials. This also applies to the other extrudable materials mentioned. These different materials are extruded through separate channel systems and separate orifices of the row.

DESCRIPTION OF THE PREFERRED EMBODIMENTS

Figure 1:
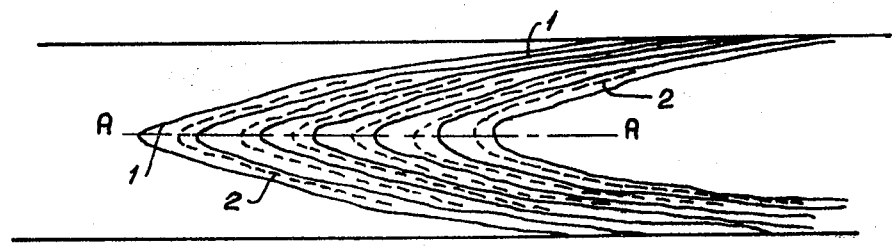
FIG. 1 shows a sectional view in enlarged scale of a sheet material having lamellae of U form before the separation along the line A—A.

In FIG. 1 the sheet material is shown for simplicity as being made of only two materials, a first extrudable polymeric material forming the lamellae 1 and a second extrudable material forming the lamellae 2. For clarity the lamellae are represented by lines but actually they have a thickness corresponding to the spacing of the full and dotted lines. As shown the lamellae are smeared out to form a flat sandwich-like structure near the surfaces to increase the coherence of the material in these zones while the lamellae are substantially perpendicular to the sheet plane in the core zone. The line A—A indicates the plane of separation. It is not necessary that this plane of separation is located exactly in that portion of the core zone in which the lamellae are perpendicular to the sheet plane.

In FIG. 1 both surface layers consist solely of the lamellae 1 of the first extrudable polymeric material and the lamellae 2 of the second extrudable material are only present in the core zone.

Figure 2:
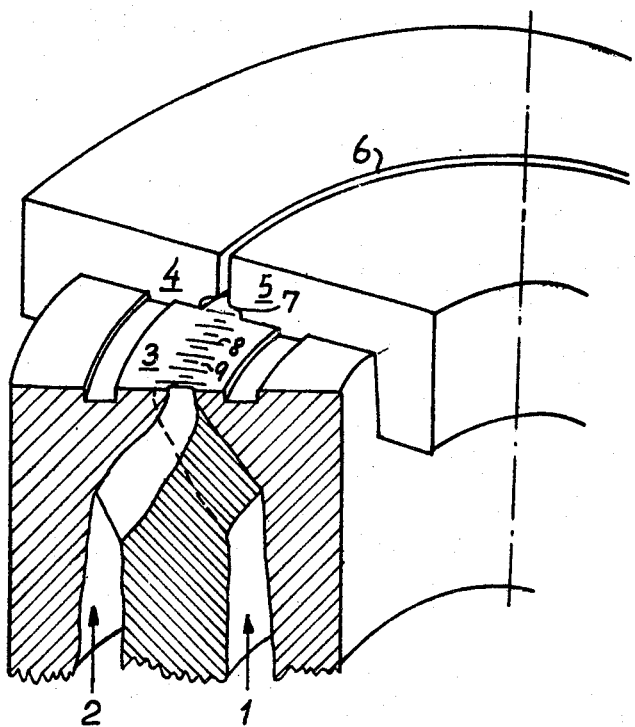
FIG. 2 is a diagrammatic perspective view, partly in section, of an extrusion apparatus comprising a ring die and a collecting chamber having a ring slot, for use in the production of a sheet material of the type shown in FIG. 1, FIGS. 3–9 show various slot arrangements for use in the extrusion apparatus shown in FIG. 2.

The apparatus shown in FIG. 2 comprises a ring die 3 comprising a row of slots cooperating with a collecting chamber which consists of two parts 4 and 5 formed so as to define an extrusion slot 6 and a neck 7. The first polymeric material 1 is extruded through the relatively long slots 8 of the ring die while the second extrudable material 2 is extruded through the shorter slots 9. The two parts 4 and 5 of the collecting chamber are rotated together relative to the row of slots so as to exert a drag on the lamellae 1 and 2 as they are extruded from the slots 8 and 9. This drag causes the lamellae to be laid in helices substantially flat along the row. Simultaneously, however, the lamellae are forced forward by further amounts of extruded material and during this movement their edges drag against the sides of the collecting chamber and in particular against the neck 7. Thereby, the lamellae are smeared out in zones near the surfaces to form a sandwich-like arrangement as shown in FIG. 1. The extruded product consists of shorter lamellae 2 separating the lamellae 1 which consequently form the surface layers of the sheet material.

If the collecting chamber (parts 4 and 5) is rotated, the equipment to haul-off the tubular sheet from the extrusion device must also rotate so as to prevent an untwisting of the helical arrangement of the lamellae. However, the collecting chamber may be in a fixed position in order to avoid such rotation of the haul-off equipment but in this case the circular row of orifices and the manifolds feeding the latter should also rotate. In this case the manifolds may be fed from extruders through revolving concentric fittings.

Figure 3:
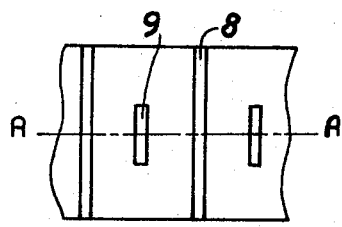

The slot arrangement used in the apparatus shown in FIG. 2 is shown in greater detail in FIG. 3 which illustrates a slot arrangement comprising long slots 8 alternating with shorter slots 9. For the sake of simplicity the row of slots is shown rectilineary.

The slot arrangements shown in FIG. 4–7 are used for the production of a sheet material having a weakened core zone thus facilitating the separation of the sheet material into two parts in a plane parallel to the sheet plane.

Figures 4, 5:
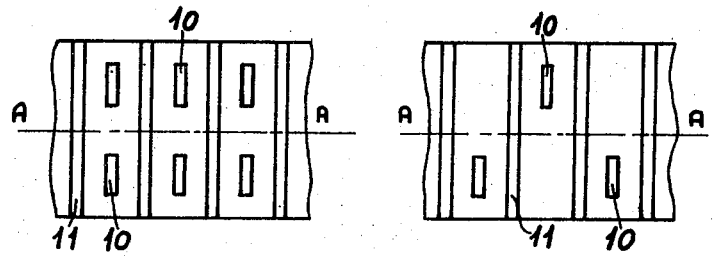

When using the slot arrangements shown in FIGS. 4 and 5 a first extrudable polymeric material is extruded through the slots 10 which are located on opposite sides of the zone of separation and an extrudable separating material is extruded through the slots 11. Thus, in the sheet material which is to be separated into two parts the lamellae of the separating material extends over the full thickness and the lamellae of the polymeric material are absent in the core zone in which the separation has to take place. A sheet material prepared by using the slot arrangements shown in FIGS. 4 and 5 is combed at the surfaces so as to bond the lamellae of the polymeric material together. The combing is carried out by means of teeth located in the collecting chamber shown in FIG. 2.

Figures 6, 7:
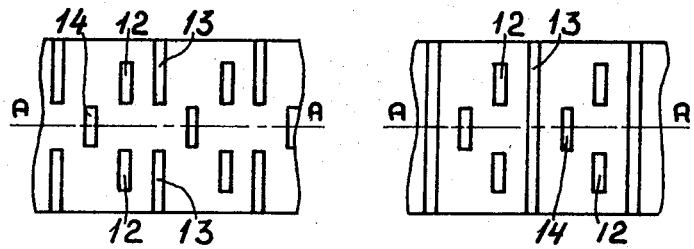

The slot arrangement shown in FIG. 6 comprises slots 12 for the extrusion of a first polymeric material, slots 13 for the extrusion of a first separating material and slots 14 for the extrusion of a second polymeric material. When using the slot arrangement of FIG. 6 a sheet material is obtained which comprises a continuous layer of said second polymeric material within the zone of separation. When the separation of such a sheet has taken place the second polymeric material may be easily removed for example by brushing. The slot arrangement shown in FIG. 7 corresponds to that of FIG. 6 except that the slots 13 for the extrusion of the first separating material extend over the full width of the die ring. When using said slot arrangement a sheet material is prepared having a core zone consisting of alternating lamellae of the first separating material and the second polymeric material.

Figures 8, 9:
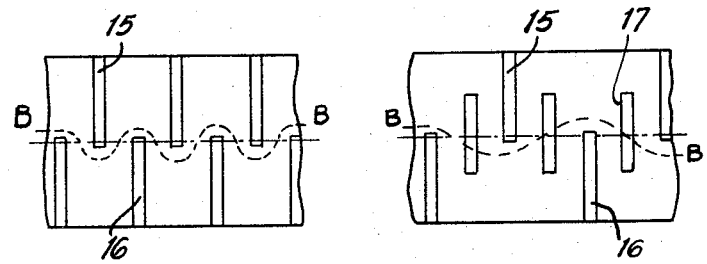

The slot arrangement shown in FIG. 8 and 9 serve to extrude sheet materials having lamellae of a first polymeric material and a second polymeric material which are in intermeshing arrangement only in the core zone. When separating a sheet material having such intermeshing lamellae within the core zone the separation will take place in an area corresponding to the zone B—B shown in FIGS. 8 and 9.

The slot arrangement shown in FIG. 9 comprises slots 15 for the extrusion of a first polymeric material, slots 16 for the extrusion of a second polymeric material and slots 17 for the extrusion of a separating material.

In a sheet material prepared by using the slot arrangements of FIGS. 8 and 9 the lamellae consisting of the first polymeric material are bonded together at one surface and the lamellae of the second polymeric material are bonded together at the other surface. When using the slot arrangements shown the lamellae in the surface layers are fused together but the bonding could also be effected by combing so as to draw out threads from the edges of the lamellae and to form bundles of adjacent threads in a sandwich-like structure.

The bonding could also be effected by injecting rows of other lamellae in the edge portions of the lamellae at the surfaces.

The introduction of lamellae of the separating material is only necessary when the lamellae of the first and the second polymeric materials tend to fuse together to form an adhesive bond, e.g., when the first polymeric material is identical to the second polymeric material.

Figure 10:
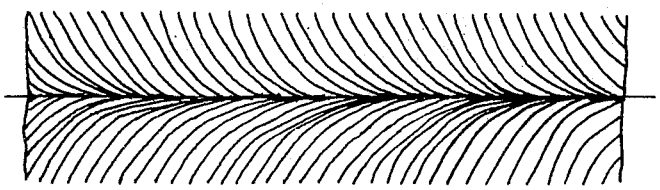
FIG. 10 shows a sectional view of a composite material prepared by separating a sheet material of the type shown in FIG. 1 into two parts and bonding the original surface layers together.

The sheet material shown in FIG. 10 has been prepared by separating a sheet material of the type shown in FIG. 1 in two parts and by disrupting the lamella structure for instance by removing the lamellae of the extrudable material 2. The two parts formed are then bonded together by means of an adhesive which is applied spotwise onto the original surface layers. By applying the adhesive spotwise a high flexibility is obtained.

The strength of the composite material may be increased by incorporating a reinforcing material for example consisting of parallel threads between the layers which are glued together.

A further increased strength is obtained by cross-laminating the two parts formed by the separation of the sheet material.

If the surfaces of the sheet material which is to be separated in two parts have been combed so as to draw out threads from the edges of adjacent lamellae the lamination is preferably carried out in such a manner that in the final product the threads originally present in one of the surface layers cross threads of the surface layer which originally was opposite to the first surface layer.

Figure 11:
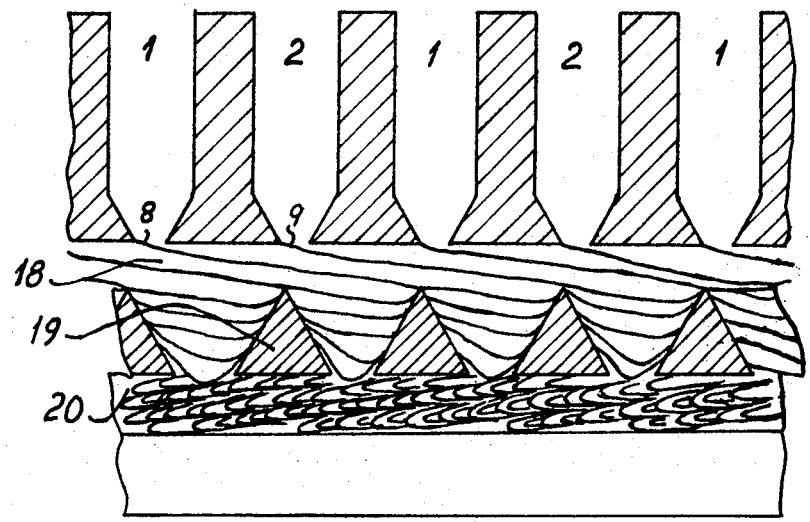
FIG. 11 is a diagram illustrating a double drawing and a simultaneous chopping of the lamellae and FIG. 12 is a diagrammatic perspective view, partly in section, of a die arrangement corresponding to that of FIG. 11.

In order to increase the fineness of the pile of the sheet materials prepared so as to make such sheet materials suitable for sanitary purposes as well as for finer carpet applications it is preferred to subject the lamellae to a double drawing in the extrusion device as shown diagrammatically in FIG. 11.

Figure 12:
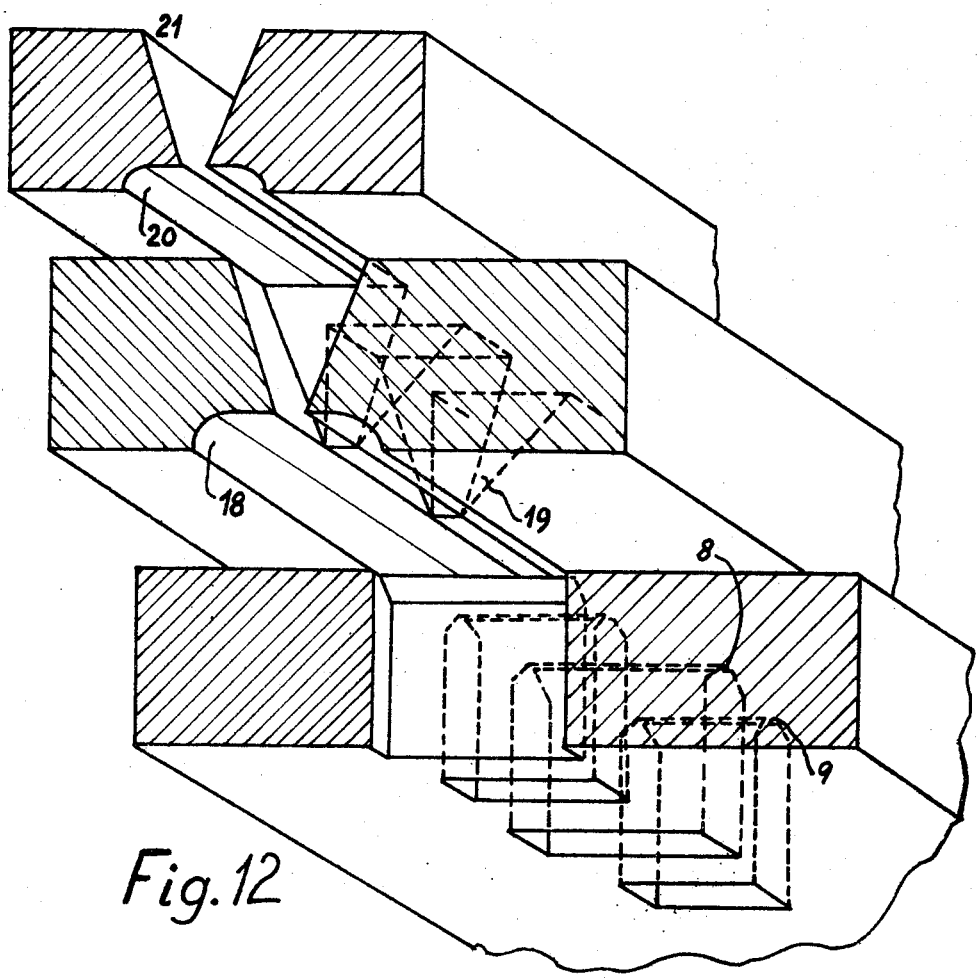

In FIGS. 11 and 12 the lateral drawing of the lamellae to form the U-shape takes place in two steps with the result that the fineness of the lamellae can be extremely high even in the core zone of the sheet and with the further result that the lamellae are chopped simultaneously with said drawing to form continuous rows of discontinuous lamellae. From the extrusion slots 8 and 9 the extrudable materials 1 and 2 flow into the rotating collecting chamber 18 while being drawn to semifine continuous lamellae which advance through the collecting chamber almost in a "broadside" flow. The neck of the collecting chamber continues in a row of channels formed by the dividing walls 19. The latter have wedge shape as shown in FIGS. 11 and 12 so that their rear ends form a kind of second extrusion orifices arranged in a row. Subsequently, the material is extruded into a second collecting chamber 20 having a similar neck and continuing in a slot 21. The continuous lamellae are chopped by the walls 19 and during the passage through the channels the flow changes from a substantially broadsiding flow to a substantially longitudinal flow so that the lamellae emerge in bunches from each of the channels. Each bunch is further drawn due to the movement between the walls 19 and the second extruding chamber 20 and form a row in the extruded sheet.

In the slot 21 the chamber may widen smoothly in order to make the material thicker, if desired, and in order to raise the center portion of the U. For this purpose it may be advantageous to cool the second collecting chamber, e.g., by means of a cooling medium which is circulated through channels in the walls of said collecting chamber.

I claim:

1. A method for the production of synthetic sheet materials comprising the steps of extruding a plurality of separate streams of each of a first extrudable polymeric material and a second extrudable material; merging said streams in generally interspersed juxtaposed relation to form a coherent fluid composite substantially sheet-like structure comprising an array of lamellae of said first material interspersed with lamellae of said second material, said lamellae having their faces extending generally perpendicular to the sheet surfaces, extruding said composite sheet structure through a smearing zone, in which frictional force is applied against the opposite sheet surfaces whereby the portions of the lamellae of both materials adjacent the sheet surfaces are displaced into generally flat-sandwich relation lying substantially parallel to the sheet surfaces while the interior portions of said lamellae remain in their initial generally perpendicular relation to said sheet surfaces; setting said smeared sheet-like structure; subjecting the set structure to a disrupting treatment to disrupt the connections between the interior portions of the lamellae of said first material; and either before, during, or after said disrupting treatment cleaving said sheet along a plane passing through said interior lamellae portions generally parallel to the planes of the sheet surfaces.

2. A method as in claim 1, wherein said cleaving is effected by cutting action.

3. A method as in claim 1, further comprising the steps of combing threads out from the lamellae of said first polymeric material while passing the fluid sheet structure through said smearing zone so as to form bundles of threads bonding the lamellae together adjacent at least one surface of the structure.

4. A method as in claim 1, wherein the streams of said extrudable first polymeric material are extruded so as to form separate lamellae located on opposite sides of the plane of cleavage of the sheet structure.

5. A method as in claim 1, in which the second extrudable material is also polymeric and further comprising extruding streams of a third extrudable material so as to form lamellae of said third extrudable material disposed in the interior region of said structure and at least partially removing said third extrudable material either during or after the cleavage of the sheet while leaving a substantial part of said second polymeric material in the sheet.

6. A method as in claim 5, wherein the third extrudable material is incompatible with both the first polymeric material and the second polymeric material.

7. A method as in claim 5, in which the streams of the third extrudable material are joined with the streams of the first polymeric material and the second polymeric material so as to form a continuous layer of said third extrudable material within the interior region of the sheet.

8. A method as in claim 5, in which the streams of the second and the third extrudable materials are joined so as to form alternating lamellae within the interior region of the sheet.

9. A method as in claim 5, wherein the second extrudable material is a finely dispersed mixture of two or more polymers, whereas the third extrudable material is a substantially homogeneous material.

10. A method as in claim 1, in which the second extrudable material is a further extrudable polymeric material and in which the streams of one of said polymeric materials are of reduced dimension in the direction perpendicular to the sheet surfaces so that the lamellae of the first and the further polymeric material are located in overlapping relationship only in the interior region of the sheet.

11. A method as in claim 10, wherein the two polymeric materials are incompatible.

12. A method as in claim 10, further comprising extruding streams of another extrudable material and joining said streams with the streams of the two polymeric materials so as to form a sheet structure in which the lamellae of the first and the further polymeric materials intermesh and are separated in the interior region by lamellae of said other extrudable material.

13. A method as in claim 1, in which the streams are extruded in a circular row of orifices and wherein the fluid sheet structure before entering said smearing zone is divided into separate segmented streams by a circular row of partitions, said row of partitions and said row of orifices being rotated about a common axis relative to one another, whereafter the streams are united in an annular collecting chamber which is rotated relative to the row of partitions.

14. A method as in claim 13, wherein both the circular row of orifices and the collecting chamber are in fixed positions and said row of partitions is rotated.

15. A method as in claim 1, further comprising the step of bonding the two cleaved parts together with the surface layers of the sheet material before separation in adjacent relation and the disrupted interior region facing outwardly.

16. The method of claim 1 wherein the lamallae of one of said materials terminate short of the lamallae of the other material on at least one side of said sheet structure so that a surface layer of the sheet structure is substantially free of said one material on such side, the margins of the lamellae of said other material in said surface layer on passage through said smearing zone being smeared into a generally continuous skin layer.

* * * * *